(No Model.)

J. A. WOODBURY.
Car-Wheel.

No. 228,430. Patented June 1, 1880.

Witnesses:
E. A. Hemmenway
Walter E. Lombard

Inventor:
James A. Woodbury
by N. C. Lombard
Attorney.

UNITED STATES PATENT OFFICE.

JAMES A. WOODBURY, OF BOSTON, MASSACHUSETTS.

CAR-WHEEL.

SPECIFICATION forming part of Letters Patent No. 228,430, dated June 1, 1880.

Application filed April 16, 1880. (No model.)

*To all whom it may concern:*

Be it known that I, JAMES A. WOODBURY, of Boston, in the county of Suffolk and State of Massachusetts, have invented a new and useful Improvement in Car-Wheels, of which the following, taken in connection with the accompanying drawings, is a specification.

Among the more serious annoyances of running steam-railway trains, as heretofore generally managed, have been the excessive noise and the crystallization of the metal of the wheels and axles and the consequent breakage of the same before they are otherwise badly worn. This crystallization and the excessive noise are caused largely, if not entirely, by the vibration of the particles of metal of which the wheel or axle, one or both, are composed, said vibrations being caused by the blow of the wheel-rim upon the rail, and are transmitted from said rim through the web or body of the wheel to its hub, and thence to the axle and back again to the rim, which in time so completely changes the molecules of the metal as to destroy their cohesive attraction for each other, and as a result the wheel or axle breaks before it has performed one-half of the work which it might have performed but for such crystallization.

The object of my invention is to reduce the noise of running trains and render the car-wheels and axles more durable by preventing or greatly reducing the vibrations of the wheels and axles; and it consists, first, in a car-wheel having one or more pieces of rubber or other elastic material firmly clamped to its exterior at a point or points near its tread-surface, as a means of absorbing the vibrations of the rim of the wheel and preventing their transmission to the hub of the wheel, and through it to the axle.

It further consists in a car-wheel cast in one piece, and having applied thereto one or more pieces of rubber or other suitable elastic material in a position near the tread-surface of the wheel, and adapted to absorb the vibrations of the rim and prevent their transmission to the hub.

It further consists in the combination, with a car-wheel, of a ring of rubber firmly secured to the hub of said wheel in a position to surround and adapted to press upon the axle when the wheel and axle are united, as will be described.

Figures 1, 3:
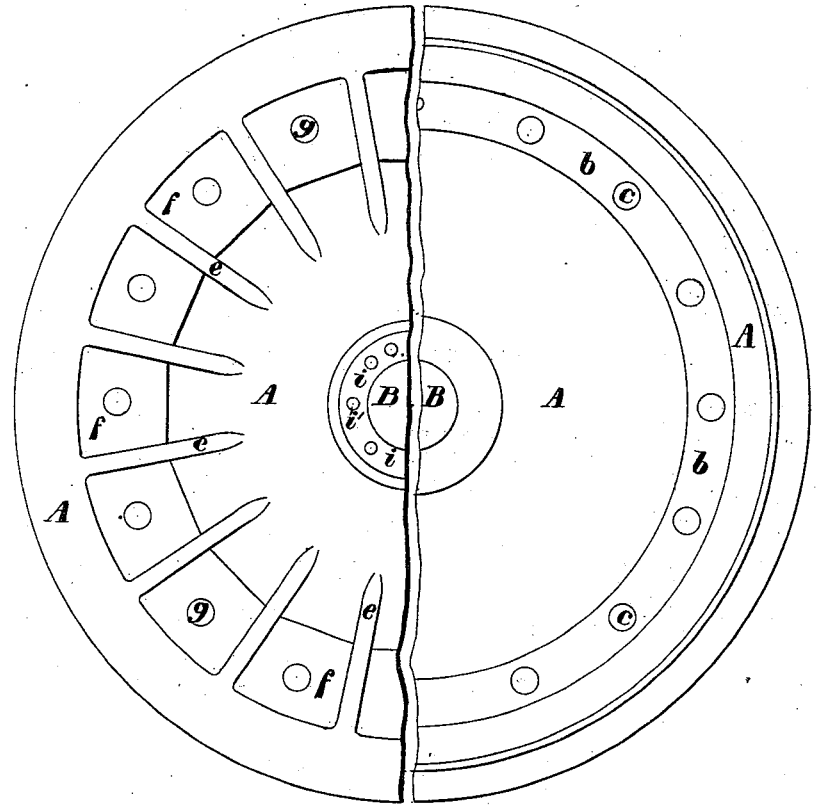
Figures 2, 4:
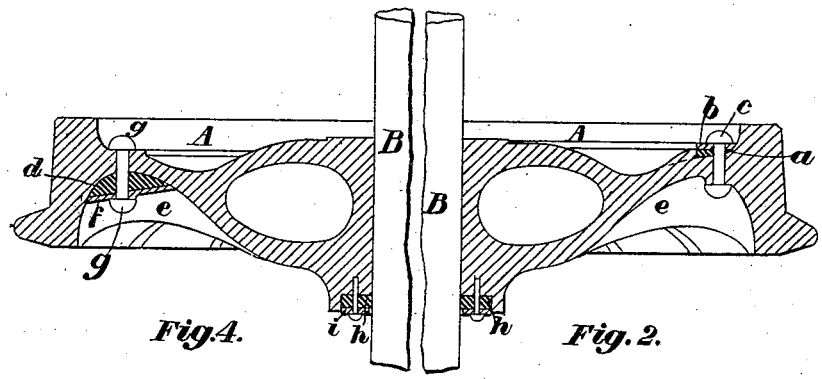

Figure 1 of the drawings is an outside elevation of one-half of a wheel embodying one form of my invention. Fig. 2 is a section of the same. Fig. 3 is an inside elevation of one-half of a wheel embodying another form of my invention, and Fig. 4 is a section of the same.

A is the body of a car-wheel of a well-known construction, to which I apply rubber to absorb the vibrations as follows: In some cases I apply the rubber to the outer face of the wheel, in the form of a ring, $a$, securely clamped to the wheel just under the rim by the metal ring $b$ and the rivets or bolts $c\ c$, as shown in Figs. 1 and 2. In other cases I apply the rubber in short pieces $d$, securely clamped to the inner face of the wheel, just under the rim and between the ribs $e$, by the metal plates $f$ and rivets or bolts $g$, as shown in Figs. 3 and 4.

The rubber blocks $d$ may be inserted between every two ribs $e\ e$, or in every alternate space; or even a less number than that may be used, as experience proves to be best.

A ring of rubber, $h$, is secured in a recess in the wheel-hub by means of the metal ring $i$ and studs $i'$, which latter may be cast in the wheel-hub or screwed in, and their outer ends are riveted down upon the ring $i$, as shown.

The ring $h$ has an opening through it of a somewhat smaller diameter than the opening through the hub of the wheel, so that it will press hard upon the periphery of the axle B when the wheel is mounted thereon, and serves to absorb the vibrations which would otherwise be transmitted to the axle, either from the vertical blow or the endwise thrust caused by the lateral motion of the car.

By this simple and comparatively non-expensive construction of the car-wheel the vibrations are greatly reduced and the tendency to crystallization correspondingly diminished, and as a consequence the usefulness of the wheel is very much increased and the noise of the running train is materially lessened.

If bolts and nuts are used to secure the clamping-ring $b$ and plates $f$, I prefer to rivet down the ends of the bolts upon the nuts after the bolts have been drawn sufficiently tight to press the rubber against the wheel without compressing it to such an extent as to destroy its absorbing properties, said riveting being for the purpose of preventing the nuts from becoming loose.

I am aware that attempts have been made to obtain the result herein sought by the use of a disk of lead secured to the wheel, but, so far as I am aware, without success.

What I claim as new, and desire to secure by Letters Patent of the United States, is—

1. A wheel having one or more pieces of rubber or other elastic material secured to its exterior surface, substantially as and for the purposes described.

2. A wheel made in one piece, and having applied thereto one or more pieces of rubber or other elastic material, substantially as and for the purposes described.

3. A wheel having a ring of rubber, h, secured to one end of its hub in a position to press upon the axle of said wheel, substantially as and for the purposes described.

4. A car-wheel having one or more pieces of rubber or other elastic material securely clamped to its surface between the radial strengthening-ribs on its inner or back face, substantially as shown and described, for the purposes specified.

5. In combination with a car-wheel, one or more pieces of rubber or other elastic material secured to its exterior surface and one or more metal plates covering said pieces of rubber and bolted or riveted to the wheel to clamp the rubber and press it hard against the wheel, substantially as described.

Executed at Boston, Massachusetts, this 13th day of April, A. D. 1880.

JAMES A. WOODBURY.

Witnesses:
E. A. HEMMENWAY,
WALTER E. LOMBARD.